United States Patent [19]

Miyamaru et al.

[11] Patent Number: 5,100,164
[45] Date of Patent: Mar. 31, 1992

[54] AUTOMATIC STAND DEVICE FOR A TWO-WHEELED VEHICLE

[75] Inventors: Yukio Miyamaru; Haruyasu Fujita, both of Tokyo, Japan

[73] Assignee: Honda Giken Kogyo Kabushiki Kaisha, Tokyo, Japan

[21] Appl. No.: 634,976

[22] Filed: Jan. 7, 1991

Related U.S. Application Data

[63] Continuation of Ser. No. 406,326, Sep. 13, 1989, abandoned.

[30] Foreign Application Priority Data

Sep. 13, 1988 [JP] Japan .................. 63-229445
Sep. 30, 1988 [JP] Japan .................. 63-246924

[51] Int. Cl.$^5$ .............................................. B62H 1/02
[52] U.S. Cl. ........................................ 280/301; 180/219
[58] Field of Search ............... 280/301, 303, 293–300, 280/302, 304; 180/219, 271

[56] References Cited

U.S. PATENT DOCUMENTS

| | | | |
|---|---|---|---|
| 2,300,762 | 11/1942 | Andrews | 280/301 |
| 3,758,736 | 9/1973 | Tanaka | 180/271 |
| 4,073,505 | 2/1978 | Yamazaki | 280/301 |
| 4,513,837 | 4/1985 | Archer | 280/293 X |
| 4,554,990 | 11/1985 | Kamiya et al. | 180/197 |
| 4,567,958 | 2/1986 | Ishihara | 180/219 |
| 4,569,239 | 2/1986 | Shirlet et al. | 180/179 X |
| 4,651,845 | 3/1987 | Yagasaki | 180/219 |
| 4,671,374 | 6/1987 | Kouyama et al. | 180/219 |
| 4,693,488 | 9/1987 | Bernocco | 280/293 |
| 4,723,619 | 2/1988 | Yamamoro et al. | 180/219 |
| 4,724,921 | 2/1988 | Ohta et al. | 180/219 X |
| 4,766,982 | 8/1988 | Hayashi et al. | 180/219 X |

FOREIGN PATENT DOCUMENTS

| | | |
|---|---|---|
| 58-206486 | 12/1983 | Japan . |
| WO84/00337 | 2/1984 | PCT Int'l Appl. . |
| 2104464A | 3/1983 | United Kingdom . |
| 2174656A | 11/1986 | United Kingdom . |
| 2174656 | 11/1986 | United Kingdom ........ 280/293 |

OTHER PUBLICATIONS

European Search Report 12.10.90–EU 1443.

Primary Examiner—Charles A. Marmor
Assistant Examiner—Kevin Hurley
Attorney, Agent, or Firm—Lyon & Lyon

[57] ABSTRACT

An automatic stand device for a two-wheeled vehicle with a plurality of sensor switch devices which individually or in conjunction are able to prevent the extension of the automatic stand device when the vehicle is in motion, and also to automatically extend the stand if so desired when the vehicle comes to a stop in the course of moving through traffic or when the vehicle is to be parked. The devices controlling the automatic stand extension each include a switch. In addition sensors are employed to control the switch based on any one or more of several criteria; position of the throttle, speed of the engine, needle position on the speedometer, and the state of a motion detector. Electrical circuits for the interpretation of these criteria are also provided.

28 Claims, 16 Drawing Sheets

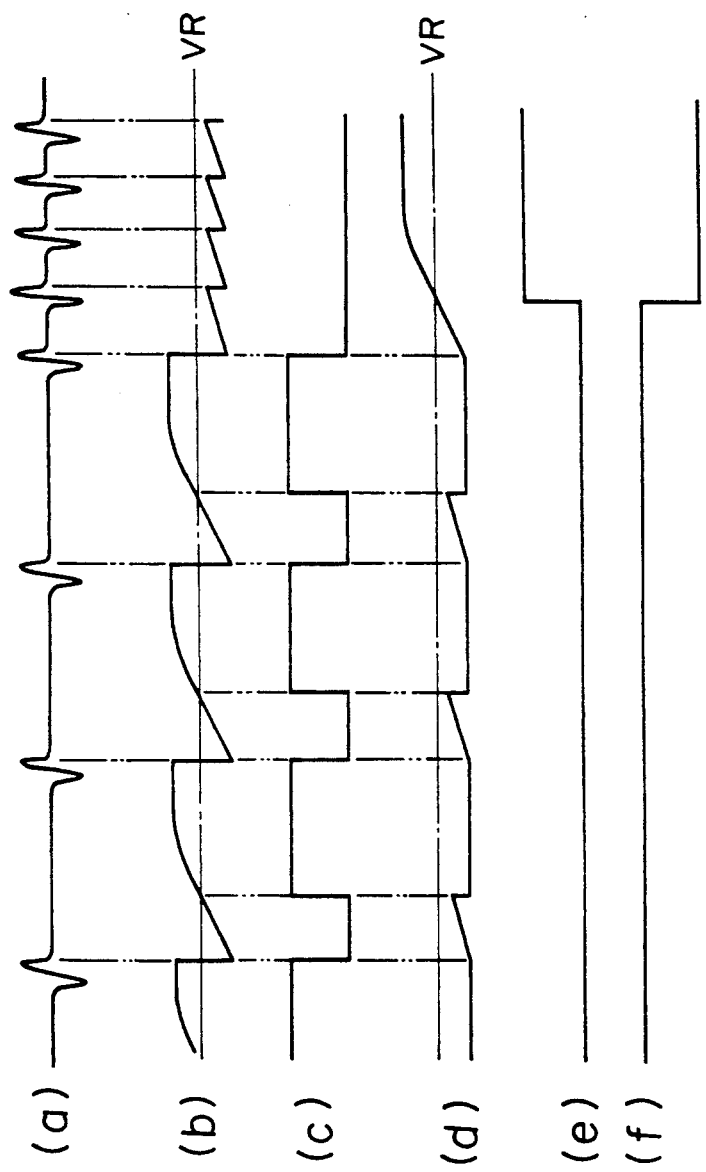

AUTOMATIC STAND DEVICE FOR A TWO-WHEELED VEHICLE

This application is a continuation of application Ser. No. 406,326 filed Sept. 13, 1989 abandoned.

BACKGROUND OF THE INVENTION

The field of the present invention is the regulating of automatic motor-driven stand devices for the support of two-wheeled vehicles when not in motion.

A stand device is typically used for the support of two-wheeled vehicles when parked or when stationary. Examples of the execution of the stand devices may be found in the Japanese Patent Application Publication (Tokkyo Kouhou) No. 53-4564. Conventionally, such stands pivot out from a retracted position near the bottom of the chassis near the rear wheel. In motorbikes, the extension and retraction of the stand is typically by means of a worm gear driven by a bi-directional motor. When the two-wheeled vehicle is stationary, the operator may activate the motor to extend the stand from the horizontal retracted position to the vertical extended position; conversely, when the vehicle is to be put in motion, the operator may activate the motor to retract the stand from the extended position.

In conventional motor-driven stand devices for two-wheeled vehicles, however, there has been no method to hold the stand in a retracted position while the vehicle is in motion by interrupting the transmission of power from the motor to the stand. The extension and retraction of the stand is controlled by the operator manually activating the motor. In conventional motor-driven stand devices for two-wheeled vehicles, there has been no method to determine whether the vehicle is in motion, and if so, to prevent the extension of the stand until a stationary state of the vehicle is achieved.

SUMMARY OF THE INVENTION

The invention relates to an automatic motor-driven stand device for the support of two-wheeled vehicles when stationary, and, in particular, the means for determining the stationary condition of the vehicle in which the stand may be extended from the retracted position. The automatic motor-driven stand device for two-wheeled vehicles comprises a pivoting stand; a stand motor to extend and retract the stand; and a sensing means that prevents the extension of the stand while the vehicle is moving. The determination that the vehicle is not moving may be based on the output of sensors which monitor the throttle, the brakes, the speed of the engine, or the movement of the vehicle; additionally, the determination may be based on a combination of these aforementioned factors.

BRIEF DESCRIPTIONS OF THE FIGURES

FIG. 9 are graphs of electrical pulse waves.

DESCRIPTIONS OF THE PREFERRED EMBODIMENTS

Figure 1:
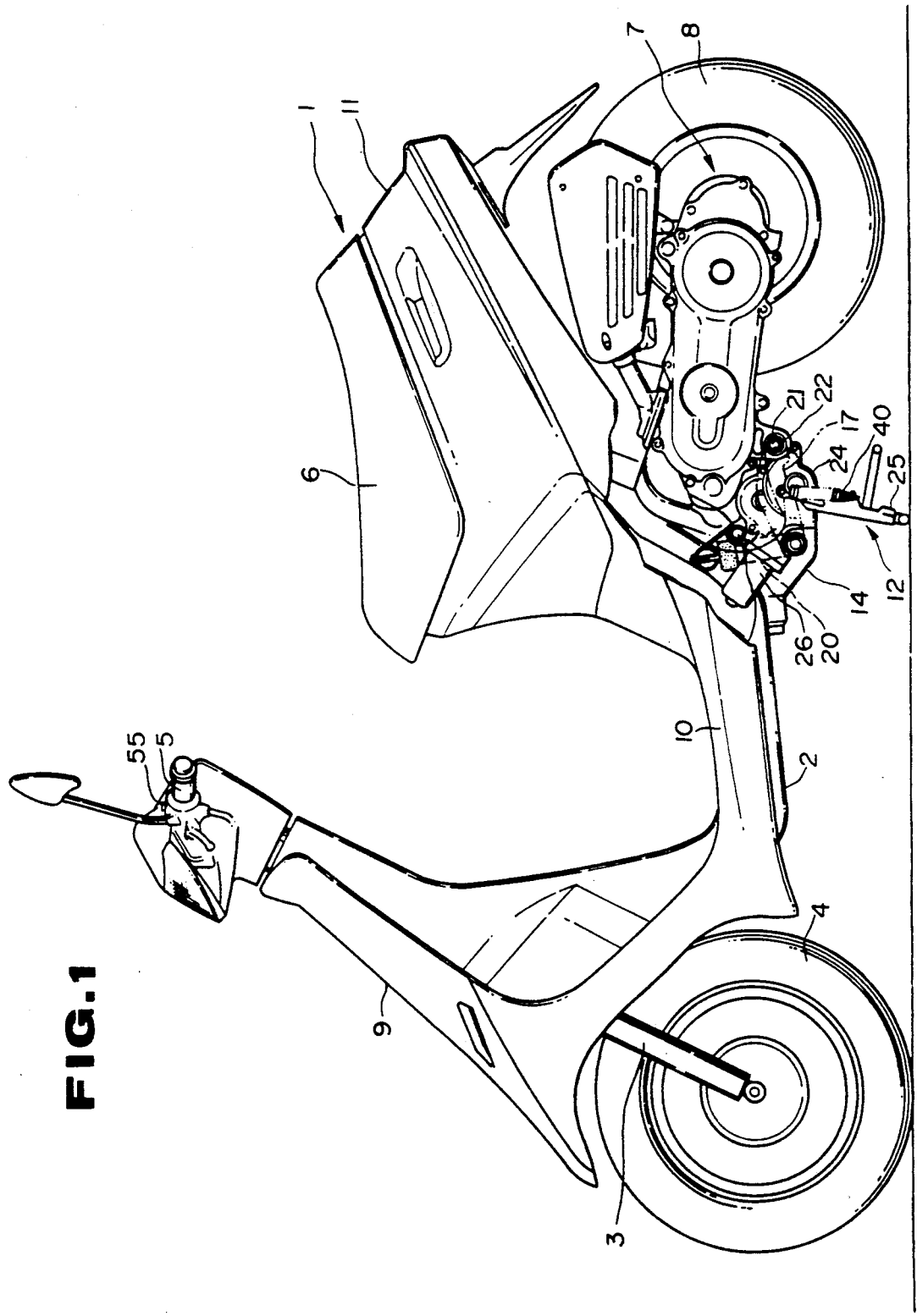
FIG. 1 is a side view of a motorbike showing a stand device of the present invention.

A motorbike 1 with the automatic stand device of the present invention is shown in FIG. 1, comprising a chassis 2, a front fork 3 that mounts a front wheel 4, a steering handle 5, a seat 6, power unit 7, a rear wheel 8, a front cover 9, a floor panel 10 on which the feet of the driver rest, a rear cover 11 and the stand assembly 12.

Figure 19:
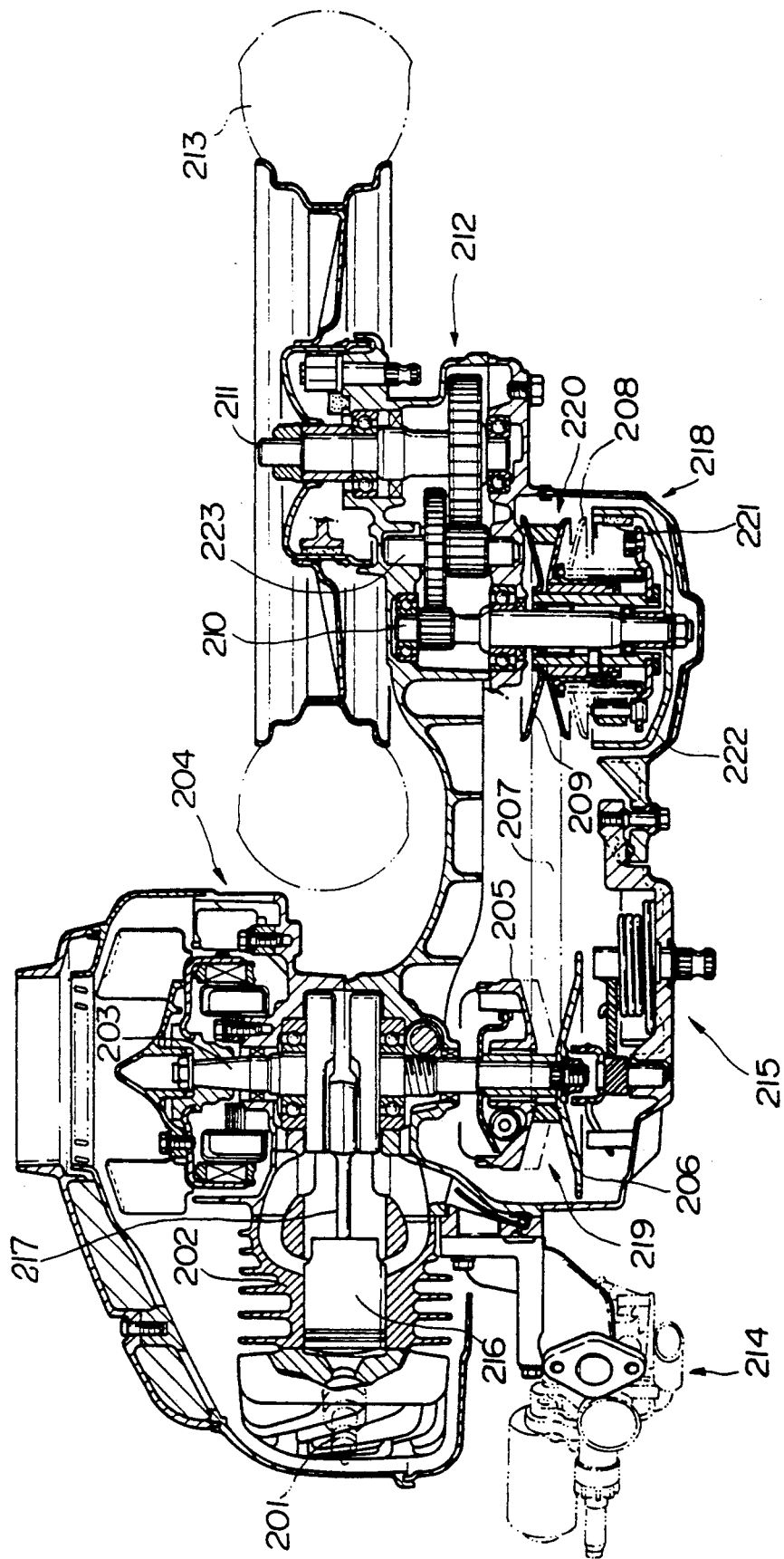
FIG. 19 is a cross section showing the power unit and power train of the motorbike in FIG. 1.

The power unit of the motorbike 1 is shown in FIG. 19 together with an automatic stand. The power unit is composed of a front block and a rear block connected to each other by a belt-type variable transmission. The front block includes an engine 202, a crankshaft 203, an alternating current generator (204) and a drive pulley 219 of the variable transmission. The rear block includes a driven pulley 220 of the variable transmission, a centrifugal clutch 218, reduction gears 212 and a drive wheel 213. The engine 202, having an ignition plug 201 at an upper part thereof, is located at the front end of the front block and the axis of the cylinder is inclined in the vertical longitudinal plane of the motorbike. The crankshaft 203, connected to a piston 216 of the engine 202 through a crankrod 217, extends horizontally in the transverse direction. The alternating current generator (ACG) 204 is connected to an end (the upper end in FIG. 19) of the crankshaft 203. The drive pulley 219 of the belt-type variable transmission is attached to the other end of the crankshaft 203. The drive pulley 219 comprises a sliding pulley disk 205, which is slidable along the crankshaft while rotation relative thereto is restricted, and a fixed pulley disk 206 which is fixed to the crankshaft 203. The distance between the sliding pulley disk 205 and the fixed pulley disk 206 is variable as the sliding pulley disk 205 slides along the crankshaft 203.

Rearwardly spaced from the crankshaft 203 is installed a driven pulley 220 of the variable transmission, a centrifugal clutch 218, the reduction gear mechanism 212 and the drive wheel 213. The driven pulley 220 has a construction similar to the drive pulley 219. The driven pulley comprises a slidable pulley disk 208 and a fixed pulley disk 209 between which the distance is variable. A belt is wound around the drive pulley 219 and the driven pulley 220 to transmit the driving force from the former to the latter. By varying the distance between the pulley disks, the effective diameters of both the drive pulley 219 and the driven pulley 220 may be altered to vary the transmission ratio.

An input shaft 210 is disposed coaxially through the driven pulley 220 and is rotatably supported relative to the latter. The centrifugal clutch 218 is attached to an end (the lower end in FIG. 19) of the input shaft 210 so as to connect and disconnect the driven pulley 220 and the input shaft 210. More precisely, inner clutch elements 221 of the centrifugal clutch 218 are fixed to the input shaft 210, and an outer disk clutch 222 of the centrifugal clutch 218 is fixed to the driven pulley 220. The inner clutch elements 221 are disposed equidistantly about the axis of the input shaft 210 and the distance from the axis is so determined that there remains a distance between the outer surface of the inner clutch elements 221 and the inner surface of the outer clutch disk 222. Elastic means give an inward thrust force to the inner clutch elements 221 so as to keep them at that position while the driven pulley 220 is in a stationary state. The radial distance of the inner clutch elements 221 increases as the rotational speed of the driven pulley 220 increases, but the inner clutch elements still do not contact the outer clutch disk 222 while the rotational speed is lower than a predetermined value. When the rotational speed of the driven wheel 220 reaches and exceeds a predetermined level, the inner clutch elements 221 come in contact with the outer clutch disk 222 and the drive force is transmitted from the driven pulley 220 to the input shaft 210.

The reduction gears 212, having a counter shaft 223, a drive shaft 211, and the gears attached thereto, are connected to the input shaft 210. The drive force transmitted to the input shaft 210 is transmitted therefrom to the reduction gears 212 while reducing the rotational speed transmitted therethrough. Finally, the driving force is transmitted to the drive wheel 213 attached to the drive shaft 211.

By virtue of the above-mentioned construction, the driving force of the engine 202 is disconnected when the rotational speed of the driven pulley 220 is below a certain value. The driving force is automatically transmitted to the drive wheel when the rotational speed thereof surpasses a predetermined value. Furthermore, the ratio of the rotational speed of the crankshaft 203 to the driven wheel 220 is variable whether the engine is connected to the drive wheel or not.

Figure 2:
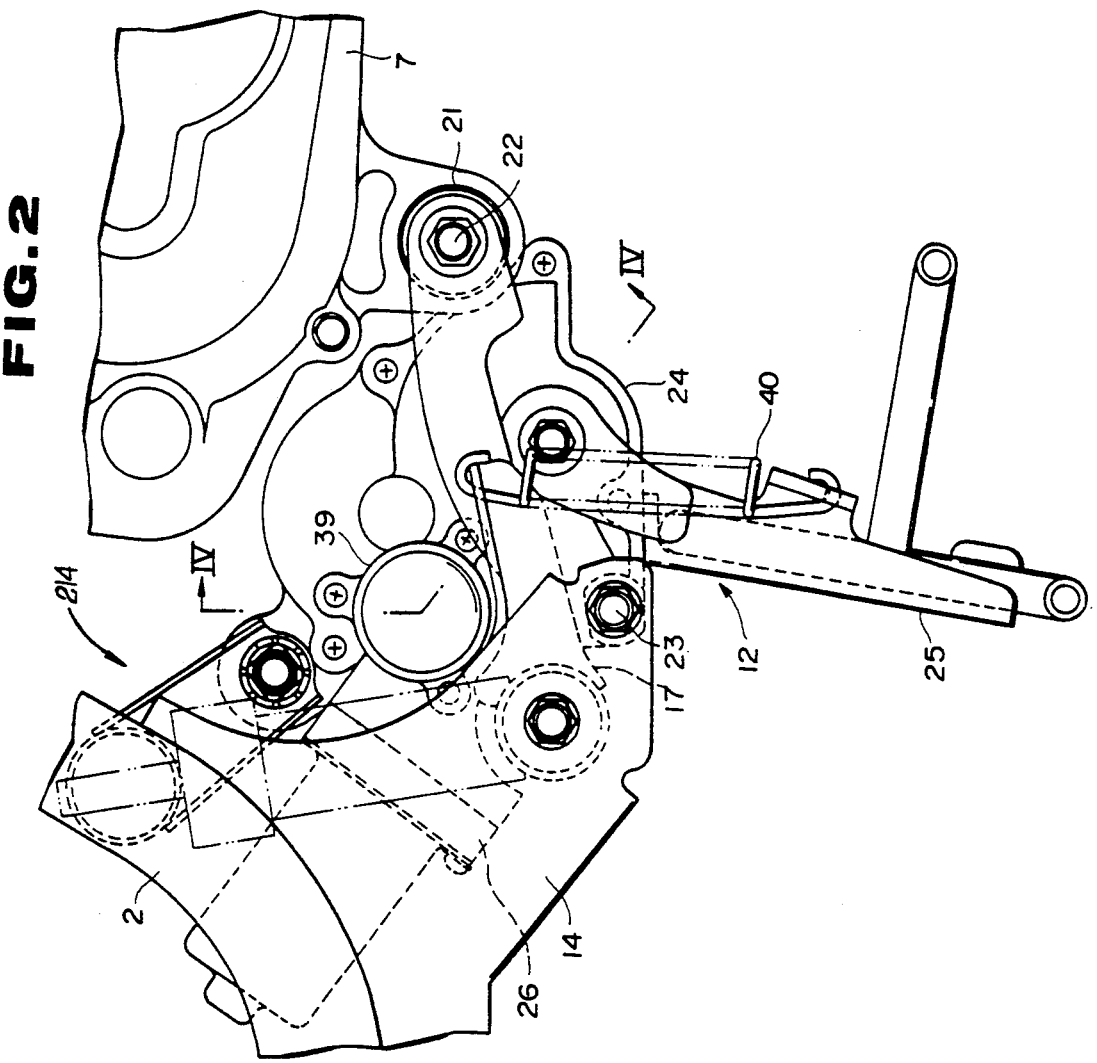
FIG. 2 is a side view of the stand device.

An automatic stand 214 is disposed at a front lower part of the power unit beside the engine. The automatic stand is described in detail as follows. As shown in FIG. 2, the power unit 7 is linked to a pair of arms 17 through a rubber bush 21 by a bolt 22. The stand assembly 12 includes the casing 24 that pivots with the pivot shaft 23 inside the bracket 14, a stand body 25 that pivots between set angles inside the casing 24, and a stand motor 26 installed inside the casing 24. The casing 24 and stand motor 26 are located between the two arms 17 on the rear of the chassis 2.

Figure 3:
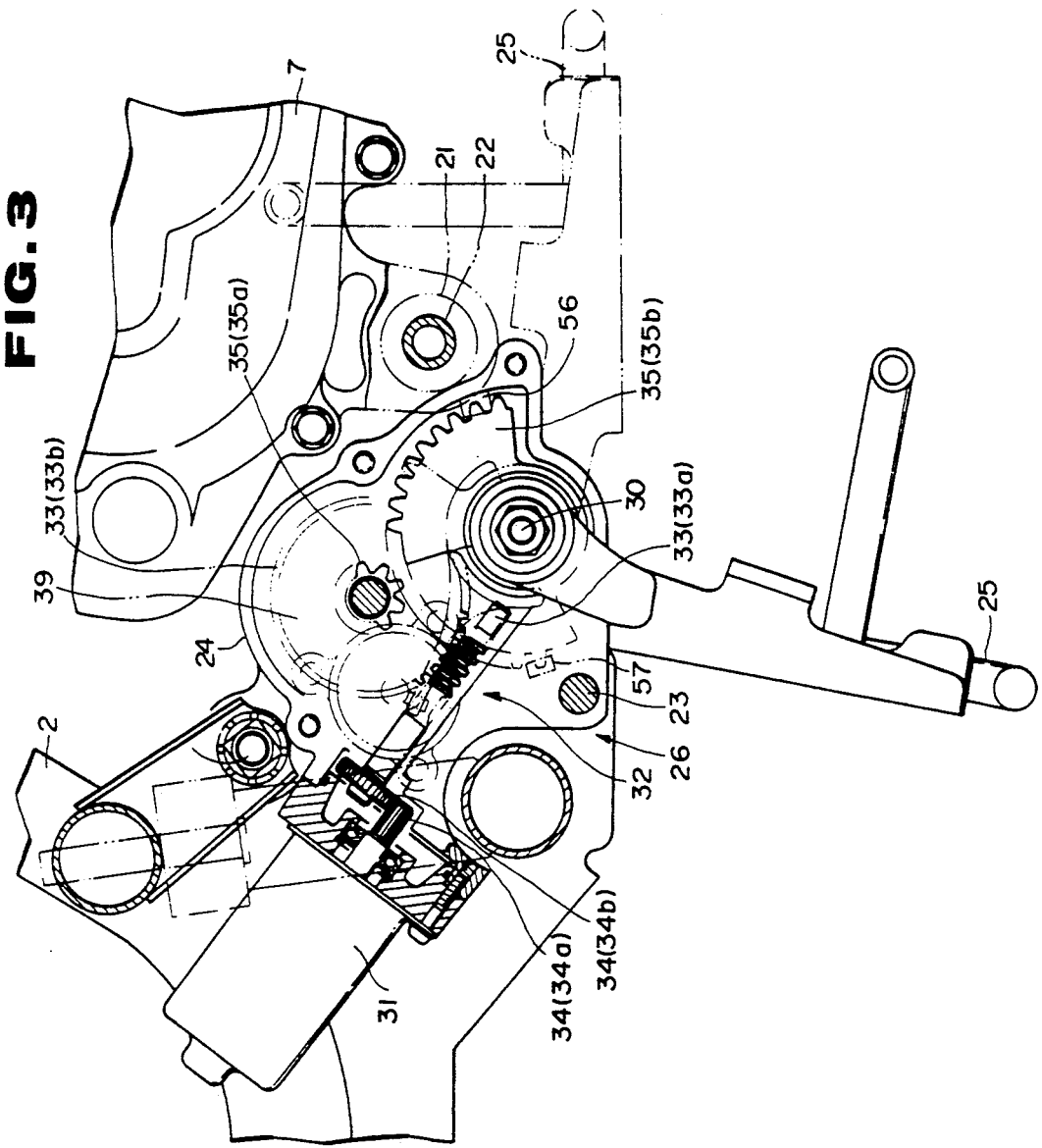
FIG. 3 is a side view of the stand device with some outer parts removed to show internal mechanisms.
Figure 4:
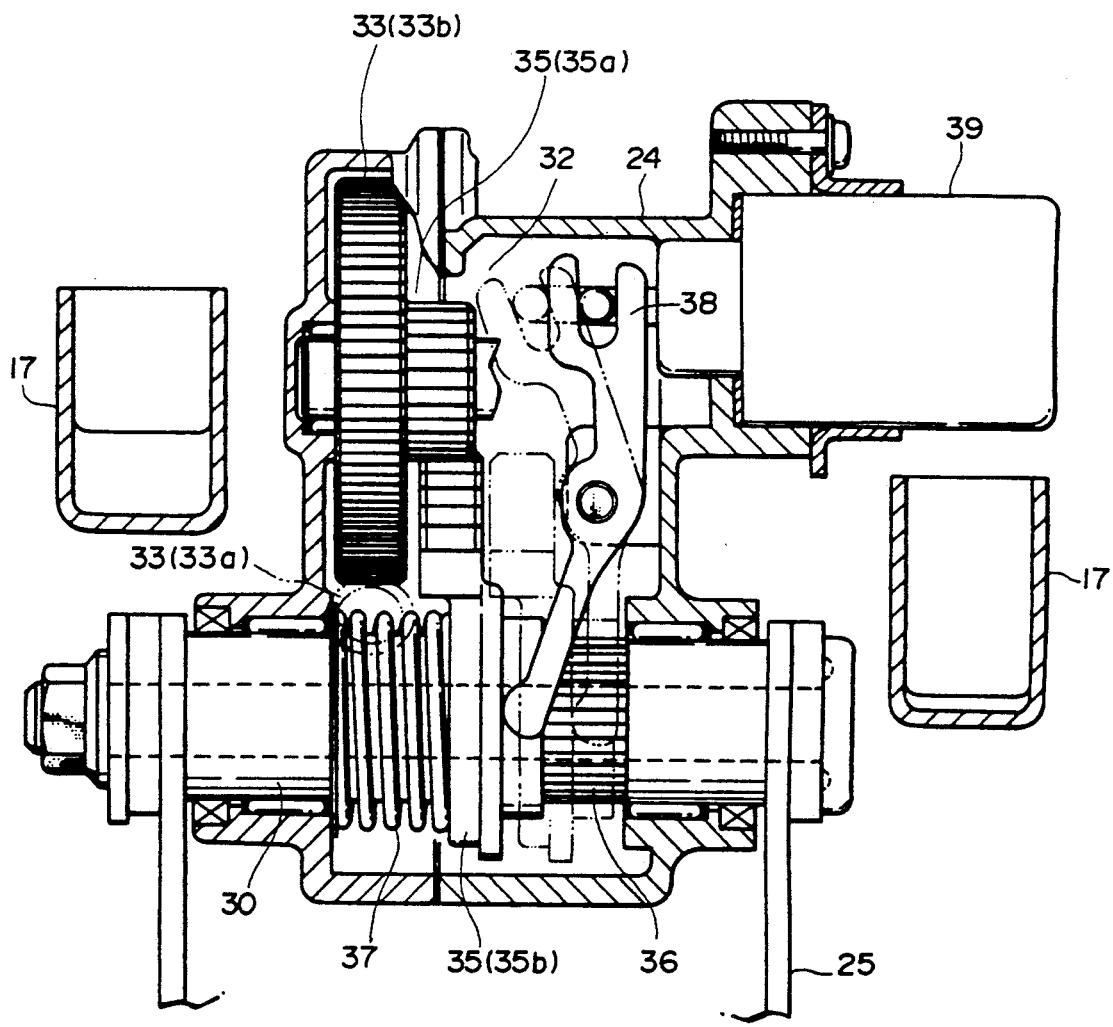
FIG. 4 is a transverse cross-section of the stand-motor transmission taken along line IV—IV of FIG. 2.

FIG. 3 and FIG. 4 show details of the mechanism of the stand motor 26. The casing 24 contains a rotary drive shaft 30 that pivots the stand body 25. The drive shaft 30 is rotated by the electric motor 31 through the transmission gear assembly 32 The motor 31 is installed parallel to the longitudinal axis of the motorbike, and at a right angle to the drive shaft 30.

The transmission gear assembly 32 includes a primary reduction gear unit 34 and a secondary reduction gear unit 35. The primary reduction gear unit 34 contains a worm gear 33 composed of a worm 33a that parallels the rotary shaft of the electric motor 31, a worm wheel 33b that engages the worm 33a, a drive gear 34a directly linked with the rotary shaft of the motor 31, and driven gear 34b directly linked with the worm 33a. The secondary reduction gear unit 35 includes a driven gear 35a installed coaxial with the worm wheel 33b, and a driven gear 35b that rotates with the drive shaft 30.

The rotation speed of the electric motor 31 is reduced by the primary reduction gear unit 34, the worm gear 33, and the secondary reduction gear unit 35. The primary reduction gear unit 34 is perpendicular to the rotary shaft of the electric motor 31, while the secondary reduction gear unit 35 is parallel to the motor shaft because its axial direction is changed by the worm gear 33. In other words, the primary and secondary reduction gears 34 and 35 are perpendicular to each other. The driven gear 35b of the secondary reduction gear unit 35 is shaped like a fan coaxial with the drive shaft 30. It disengages with the drive gear 35a when the stand 25 is at the extended position (indicated by the solid lines in FIG. 3) and the retracted position (indicated by the dashed lines in FIG. 3). Therefore, the secondary reduction gear 35 functions as a clutch.

As shown in FIG. 4, the driven gear 35b is linked to turn in synchrony with the drive shaft 30 through a spline 36. When 15 the drive gear 35a is engaged as indicated by solid lines in FIG. 4, the rotation of the motor 31 is transmitted to the drive shaft 30. When disengaged, as indicated by dashed lines, the transmission ceases. The driven gear 35b of the secondary reduction gear 35a is kept away from the drive gear 35a by a return spring 37. The force of the return spring 37 is independent of an oscillating arm 38 that slides the driven gear 35b along the drive shaft 30 when oscillated by the solenoid 39.

In FIGS. 1 and 2, a spring 40 is shown to retain the stand in either the extended or the retracted positions. With the motor 31 disengaged, the stand is free to rotate into either the extended or retracted positions but for the spring 40. By overcoming the spring 40, manual manipulation can accomplish that which may also be done by the motor 31.

Figure 5:
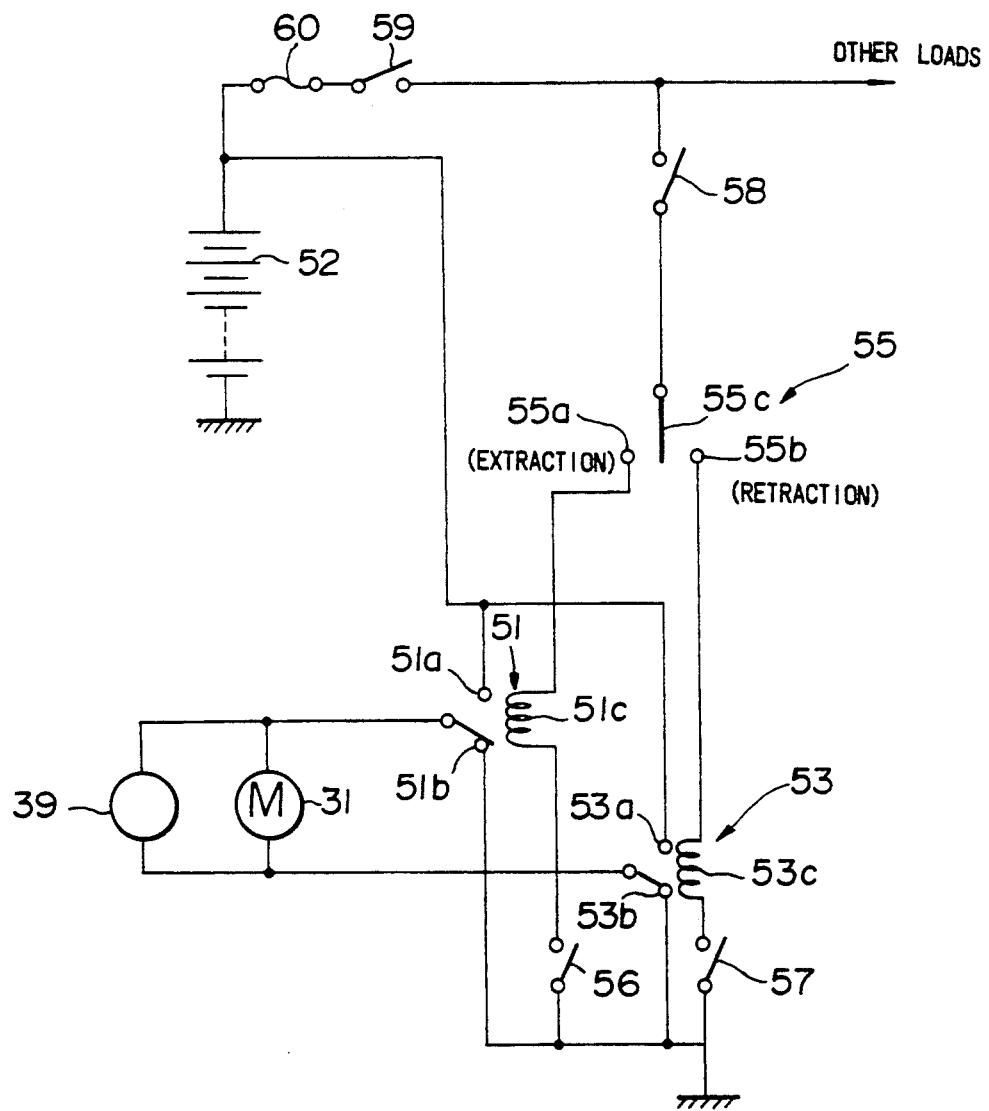
FIG. 5 is a control circuit diagram for the stand device.

FIG. 5 shows the control circuit for the electric motor 31 that drives the stand 25. One lead of the motor 31 is connected to the positive terminal of the battery 52 through the normally open contact 51a of a relay 51, or grounded through the normally closed contact 51b of the relay 51. The other lead of the motor 31 is connected to the positive terminal of the battery 52 though the normally open contact 53a of a relay 53, or connected to the negative terminal of the battery 52 through the normally closed contact 53b of the relay 53.

One end of the coil 51c of the relay 51 is connected to a contact 55a of a stand switch 55 in order to pivot the stand to the extended position; and the other end is connected to a limit switch 56 that determines if the stand is in the extended position. In contrast, one end of the coil 53c of the relay 53 is connected to a contact 55b of the stand switch 55 to pivot the stand to the horizontal position, and the other end is connected to the negative terminal of the battery 52 through a limit switch 57 that determines if the stand is in the retracted position.

A transfer contact 55c of the stand switch 55 is connected to the positive terminal of the battery 52 through a throttle switch 58, an ignition switch 59 and a fuse 60.

Figure 6:
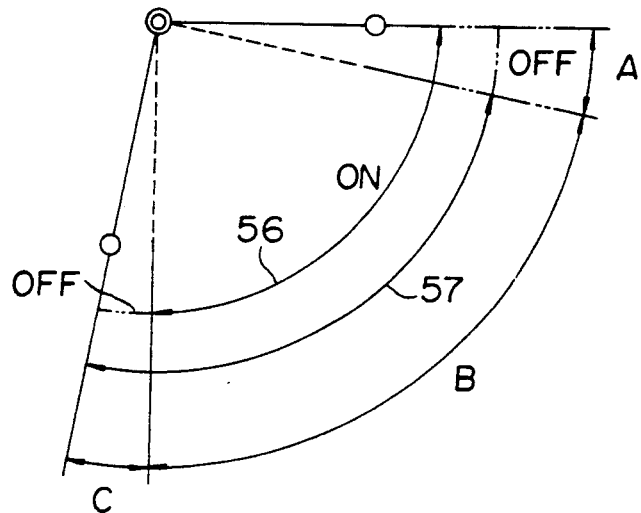
FIG. 6 is a diagram of ON-OFF positions of limit switches associated with the stand.

As shown in FIG. 1, the stand switch 55 is located near the steering handle 5 for easy access. The switch uses three positions extended, retracted, and neutral (OFF) to control operation of the stand. The limit switches 56 and 57 operate as proximity sensors to determine the position of the stand 25. As shown in FIG. 3, these switches are provided inside the casing 24 at the two ends of the pivot range of the driven gear 35b. FIG. 6 shows the ON-OFF positions of the switches 56 and 57 in relation to the pivot range of the stand 25. The switch 56 turns off when the stand 25 is extended (position C); the switch 57 turns off when the stand 25 is retracted (position A); both switches are ON when the stand is in the remaining range (positions B). The stand 25 pivots between the extended and retracted positions, and stops at either position as controlled by the limit switches.

The previous discussion relates to the automatic stand device for a two-wheeled vehicle. The present invention relates to the control of the automatic stand device so that the stand is automatically extended when the vehicle is stationary.

In a first embodiment of the present invention, a throttle switch 58 (FIG. 5) is provided to determine if the vehicle is stopped. When the throttle is closed, the engine speed decreases to idle. The centrifugal clutch is disengaged, and the throttle switch is thereby activated. The stand 25, however, remains in the retracted position because the solenoid 39 is not actuated, and the gears 35a and 35b of the secondary reduction gear 35 are disengaged.

When the stand switch 55 is turned to the extraction position 55a, electric current flows from the battery 52 to the coil 51c of the relay 51 through the closed circuit consisting of the throttle switch 58 and the limit switch 56. As a result, the normally open contact 51a closes, actuating the electric motor 31 and the solenoid 39. The oscillating arm 38 is moved to slide the driven gear 35b of the secondary reduction gear unit 35 along the drive shaft 30. The driven gear 35b is engaged with the drive gear 35a and the stand 25 pivots to the vertical position as the rotation of the electric motor 31 is transmitted through the primary reduction gear unit 35 and the worm gear 33.

The pivot motion driven by the electric motor 31 is terminated when the limit switch 56 turns off, indicating that the stand 25 has been fully extended. With the limit switch 56 turned off, the motor 31 and the solenoid 39 are turned off in turn. The stand can be returned to the retracted position by starting the vehicle with the solenoid 39 and the electric motor 31 turned off because turning off the solenoid 39 will disengage the drive gear 35a and the driven gear 35b of the secondary reduction gear to enable the stand 25 to pivot, resisted only by the spring 40. When the vehicle is started, the throttle switch 58 turns off to open the circuit of the motor 31, preventing the motor and the solenoid from being turned on even with the stand switch 55 turned to the extraction position. This results in the stand 25 remaining in the retracted position.

The stand 25 can also be returned to the horizontal position by using the electric motor 31. When this occurs, the gears 35a and 35b of the secondary reduction gear 35 must be engaged (limit switch 57 is ON). When this is done, the stand switch 55 is turned to the horizontal position. The relay 53 is actuated to close the normally closed contact 53a. As a result, current flows to the electric motor 31 in the opposite direction and cause the stand 25 to pivot to the retracted position. As shown in FIG. 6, when the stand 25 fully pivots to the retracted position, the limit switch 57 turns off to stop the current to the motor 31. The pivot motion can be effected only when the throttle switch 58 is ON and the vehicle is stopped. In this embodiment, a period of time exists between the time the throttle is closed and the speed of the engine decreases, and this is the time taken by the delay of switch 58 that closes the throttle (see FIG. 5).

In a second embodiment of the present invention, an engine speed sensor circuit is located between the ignition switch 59 and the stand switch 55. This arrangement is diagrammed in FIG. 7. The sensor is activated when the engine speed is reduced below a preset limit, and when the sensor is activated, the motor 31 causes the stand 25 to pivot.

Figure 8:
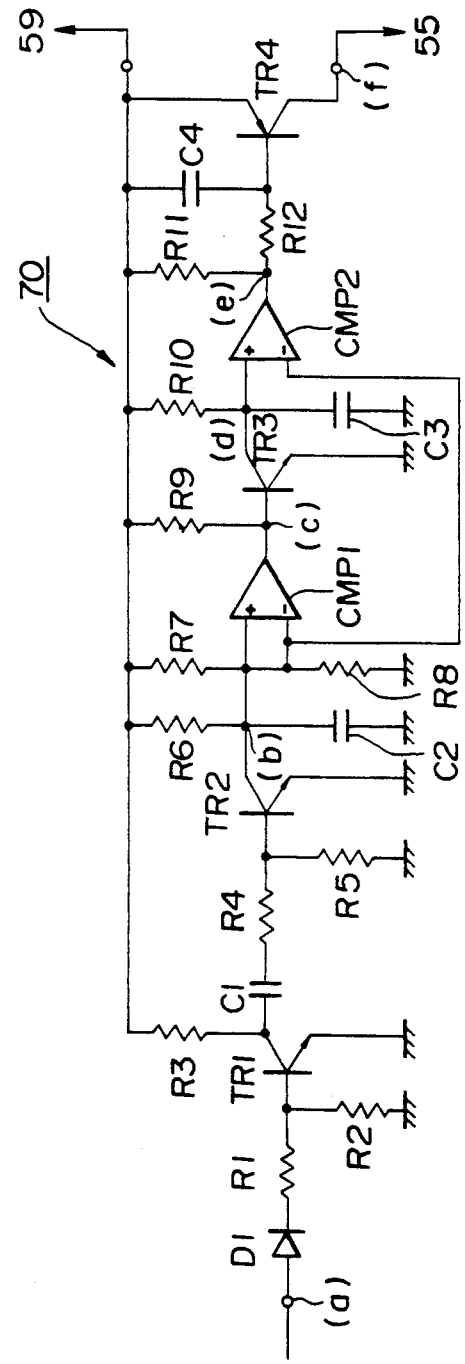
FIG. 8 is an electronic configuration of the engine-speed determination circuit in FIG. 7.

FIG. 8 shows the construction of this sensor circuit. When a rotation pulse (see FIG. 9(a)) is generated from the ignition system, it is filtered through a diode D1 to pass only the positive element, which is divided through resistors R1 and R2 to be fed to a transistor TR1. The transistor TR1 is connected to a capacitor C1 through a resistor R3. The capacitor C1 is discharged each time the transistor TR1 is turned on. The other terminal of the capacitor C1 is connected to the input of transistor TR2 through voltage divider resistors R4 and R5. Output of the transistor TR2 is fed to a capacitor C2 through a resistor R6. The voltage of the capacitor C2 is shown in FIG. 9(b).

As engine speed decreases, the capacitor C1 discharges less often, and so the transistor TR2 turns off frequently to increase the voltage of the capacitor C2. As engine speed increases, the frequency of the transistor TR2 turning off decreases and decreases the voltage of the capacitor C2.

The voltage of the capacitor C2 is supplied to the positive terminal of a comparator CMP1 for comparison with a reference voltage VR. The reference voltage VR is generated by resistors R7 and R8, and passes to the negative terminal of the comparator CMP1.

FIG. 9 shows the CMP1 which generates pulses that increase as the voltage of the capacitor C2 increases above the reference voltage VR. This means that the pulse from the comparator CMP1 decreases as the engine speed increases. The output of the comparator CMP1 is supplied to a transistor TR3 through a resistor R9. The output of the transistor TR3 is connected to a capacitor C3 through a resistor R10. The capacitor C3 is charged to increase its voltage when the transistor TR3 is off, or the pulse at point (c) decreases (FIG. 9(d)). Therefore, the voltage at point (d) increases as engine speed increases. This voltage is supplied to the positive terminal of a comparator CMP2 for comparison with the reference voltage VR. FIG. 9(e) shows the output voltage of the comparator CMP2, which increases when the voltage at the point (d) increases above the reference voltage VR. The voltage at the point (e) is smoothed by resistors R11 and R12, and by a capacitor C4, and is then passed to a transistor TR4.

Figure 7:
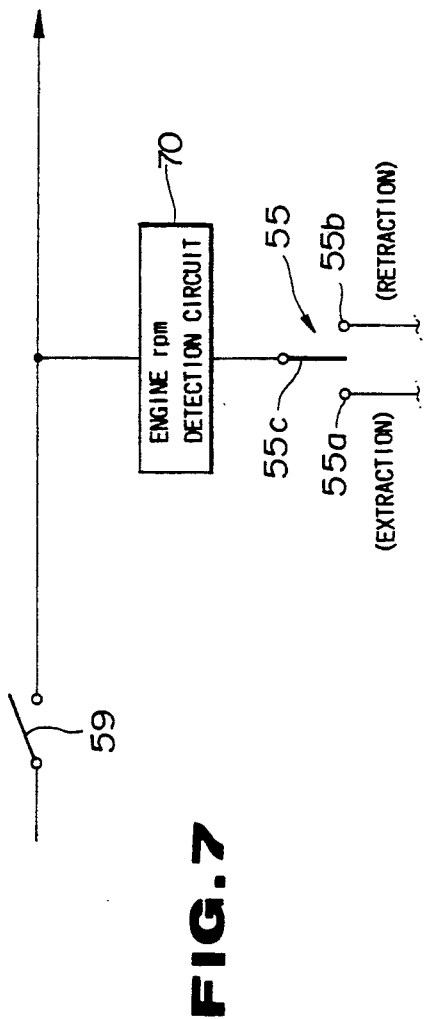
FIG. 7 is a diagram of the relationship between the engine-speed determination circuit and switches.

The transistor TR4 is connected to the ignition switch 59 and stand switch 55 shown in FIG. 7. When engine speed increases above a preset level, the transistor TR4 turns off to break the circuit between the ignition switch 59 and the stand switch 55. The waveform at point f is shown in FIG. 9(f).

The engine speed sensor circuit 70 remains open when engine speed is above a preset level. The stand motor 31 that drives the stand 25 can be started only when the engine speed is below this preset level.

A third embodiment of the present invention is shown in the electrical configuration of FIG. 10. This embodiment features a normally closed relay driven by an AC generator. The relay replaces the throttle switch 58 in FIG. 5, and allows the pivot stand 25 to be extended when the engine speed falls below a preset level. An AC generator 81 has a lamp coil 81a and an ignition coil 81b connected to an ignition system 80. The lamp coil 81a supplies AC current to the lamp 80 through a switch 82, and the lamp coil 81a is connected to the normally closed relay. The output of the regulator 84 is charged to the battery 52 through this lamp coil 81a (see FIG. 5).

Figure 10A:
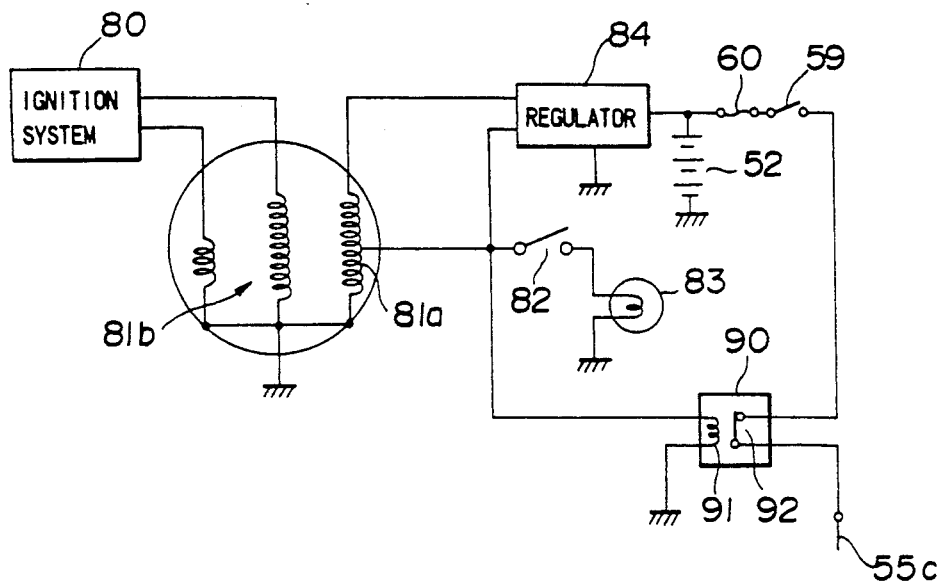
FIG. 10 are electrical configurations of an engine-speed detector.
Figure 10B:
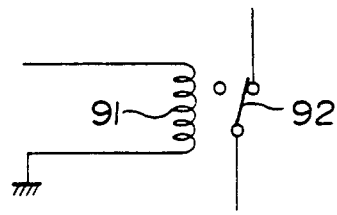
Figure 10C:
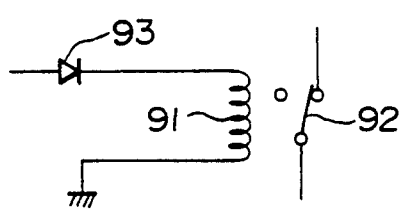
Figure 10D:
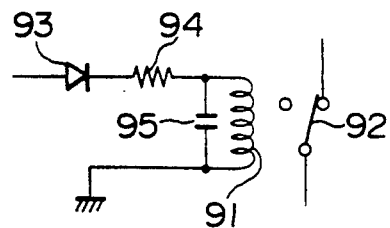
Figure 11:
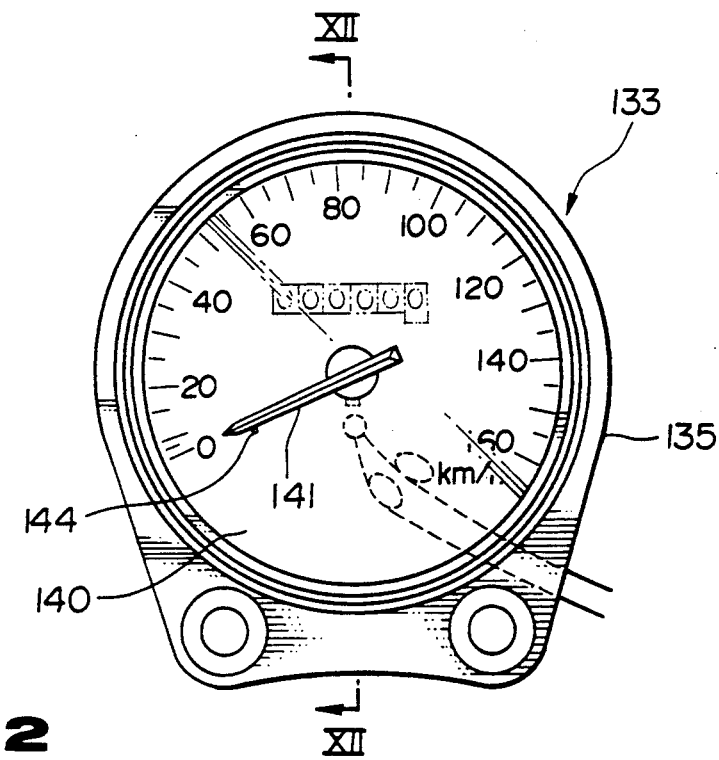
FIG. 11 is a view of the speedometer and the speed sensor.

A relay 90 is AC/DC compatible. When used as an AC relay, its coil 90 should be connected directly with the lamp coil 81a, and a normally closed contact 92 should be installed at the same position as the throttle switch 58 (see FIG. 10(b)). The contact 92 is connected to the battery 52 through the ignition switch 59 and fuse 60, and to the transfer contact 55c of the stand switch 55 (see FIG. 5). It can be used as a DC relay if connected as shown in FIG. 10(c) or 10(d). The circuit (c) has a diode 93 inserted between a coil 91 of the relay 90 and the lamp coil 81a. On the circuit (d), the diode 93 and a resistor 94 are serially connected, and a smoothing capacitor 95 is installed parallel to the coil 91. In both cases, the NC contact 92 should be installed at the same position as the AC circuit.

When the engine is started, electromotive forces are generated by the lamp coil 81a, and when the voltage increases above a preset level, the relay 90 is actuated to open the contact 92. In this state, the motor 31 cannot be started. As engine speed decreases, output voltage of the lamp coil 81a also decreases, and when the output voltage decreases below a preset level and releases the relay 90 the contact 92 is closed to start the motor 31 that drives the stand 25. Therefore, the stand 25 is extended when the vehicle is not moving.

Figure 12:
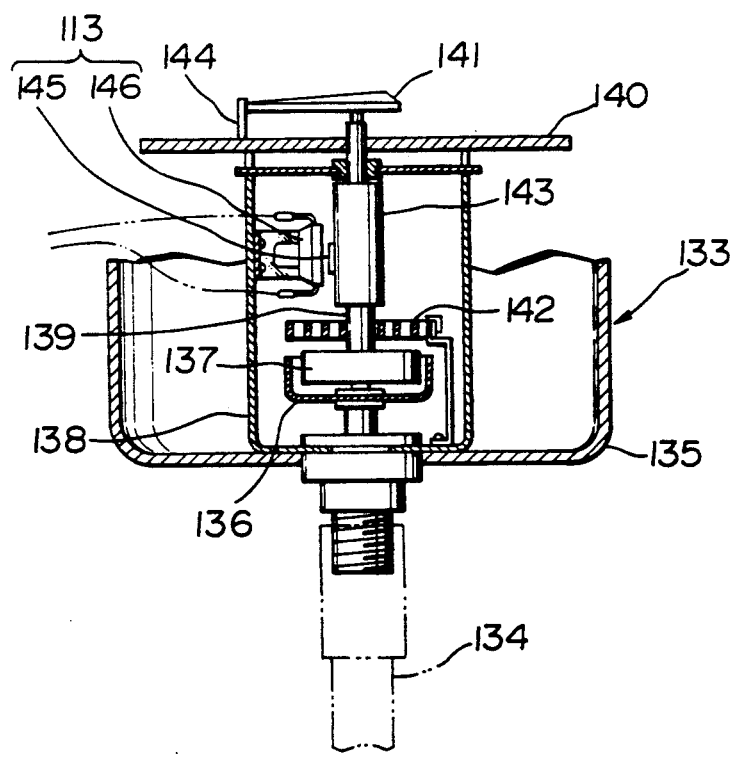
FIG. 12 is a cross section of the speedometer and the speed sensor of FIG. 11 taken along line XII—XII of FIG. 11.

In a fourth embodiment of the present invention, the control of the extension of the automatic stand device for a two-wheeled vehicle is based on monitoring the position of the speedometer needle; the position of the needle is used as an indication that the vehicle is stationary. A speedometer 133, shown in FIG. 12, freely rotates mounted in a casing 135. The speedometer 133 includes a rotation magnet 136 driven by a speedometer cable 134, an aluminum disk 137 freely rotating relatively to the same axis of the rotation magnet 136, stay 138 integrated with the aluminum disk 137 and mounted on the casing 135, a display plate 140 in which a rotation shaft 139 is inserted and freely rotatable, a guide needle 141 at the end of the display plate 140 in which the rotation shaft 139 is inserted, and a return spring 142 installed between the rotation shaft 139 and the stay 138. The rotation shaft is inserted through a control pipe 143 and installed in the stay 138, while the return spring 142 is mounted on the side on which the rotation shaft 139 is connected with the aluminum disk 137. A stopper 144 is mounted so as to protrude from the display plate 140 to stop the guide needle 141 at "0" on the display plate 140 by integrating the guide needle 141 with the plate.

The stop-acknowledgment means 113 in this embodiment is composed of each component of the speedometer 133, a magnet 145 integrated with control pipe 143, and a proximity switch 146 integrated with the stay 138. The magnet 145 and the proximity switch 146 are positioned so that the proximity switch 146 will be "ON" when the guide needle 141 is set with the stopper 144. The impact on the guide needle 141 is reduced by mounting the magnet 145 near the center position of the rotating shaft 139.

Figure 13:
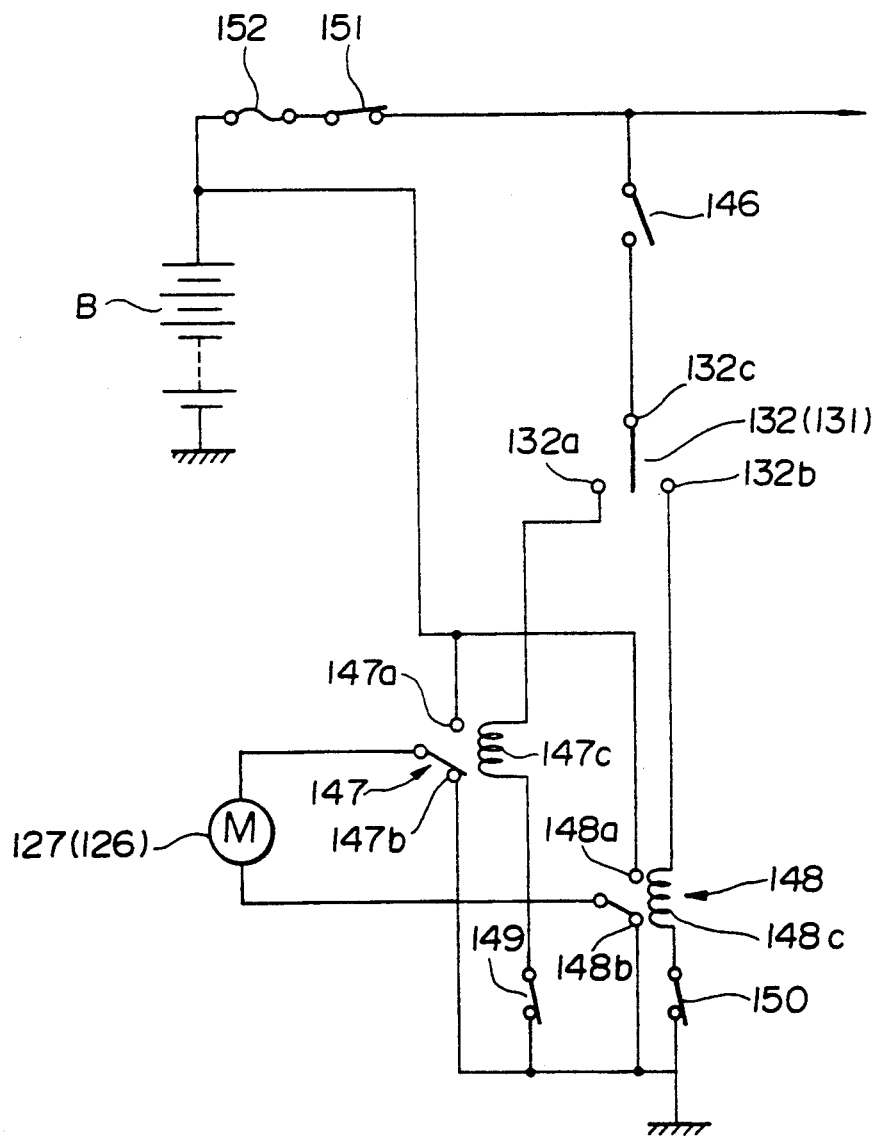
FIG. 13 is another control circuit diagram for the stand device.

The control circuit to drive the stand 25 will be explained based on FIG. 13 and FIG. 14. In FIG. 13, an electric motor 127 is connected with the positive terminal of the battery B through a contact 147a of a relay 147, and with the negative terminal of the battery B through a contact 147b of the relay 147, while the other end of the electric motor 127 is connected with the positive terminal of the battery B through a relay 148, and with the negative terminal of the battery B through the relay 148. One end of the coil 147c of the relay 147 is connected with a stand-up contact 132a of a switch 132, while the other end is connected with the negative terminal of the battery B through a stand-up limit switch 149. Another coil, the coil 148c of the relay 148, is connected with an accommodation contact 132b in the switch 132, and the other end is connected with the negative terminal of the battery B through an accommodation limit switch 150. Thus, the operation means 131 of the present example of execution is composed of the switch 132, both relays 147 and 148, the stand-up limit switch 149 and the accommodation limit switch 150. The switch contact 132c of switch 132 is connected to the positive terminal of battery B through the proximity switch 146, an ignition switch 151, and a fuse 152.

In this embodiment, when the two-wheeled vehicle stops, the front wheel 4 ceases rotation, and the guide needle 141 of the speedometer 133 comes in contact with the stopper 144. When this happens, the magnet 145 mounted on the rotation shaft 139 will activate the proximity switch 146. The stand 25 may then be extended by activating the switch 132 of the operation means 131. Since proximity switch 146 is ON if the switch 132 is pushed down to the stand-up contact 132a, the current flows to the coil 147c of the relay 147 and the fixed off-contact 147c of the relay 147 is closed so that the electric motor 27 may be operated to extend the stand body 25 to the extended position. The rotation of the stand body 25 will terminate when the stand body 25 is pivoted to the extended position and the limit switch 149 is off.

Conversely, when the stand body 25 has to be retracted, the switch 132 is pushed, and the proximity switch 148 mounted in the speedometer 133 is "ON", thereby retracting the stand body 25. By this switch operation, the electric current flows to the coil 148c of the relay 148 and closes the fixed off-contact 148a of the relay 148, the stand body 25 will pivot to the retracted position simultaneously as the electric motor 27 rotates in the opposite direction. The pivoting of the stand body 25 to the retracted position is stopped by switching off the retraction limit switch 150 when the stand body 25 is fully retracted. Thus, the stand body 25 is extended only when the vehicle is stationary.

Figure 14:
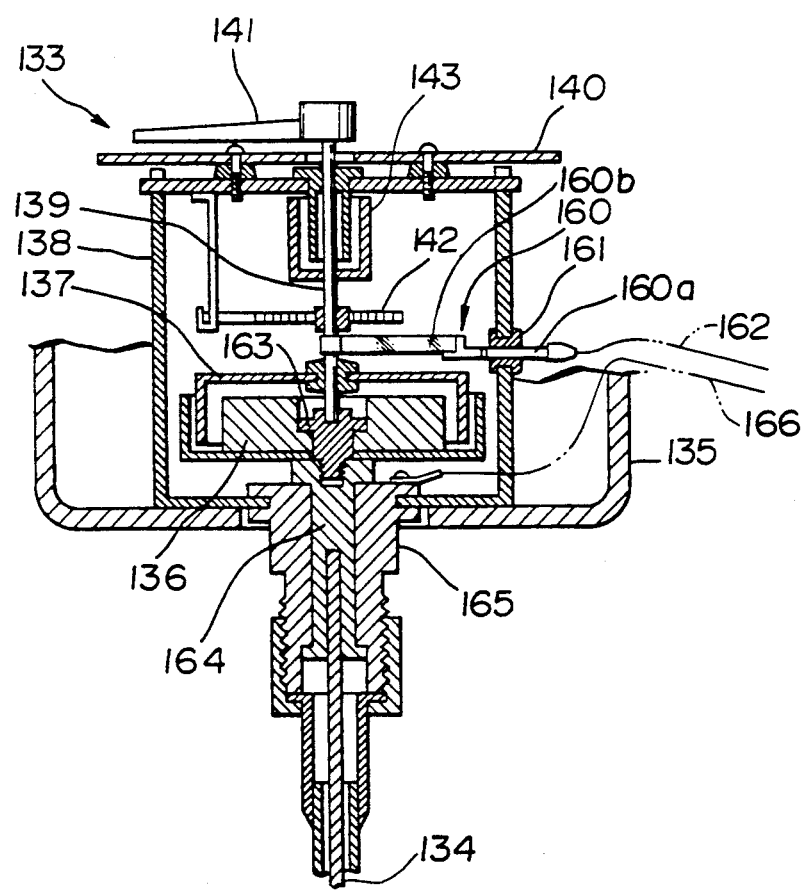
FIG. 14 is a cross section of a variation of the speedometer and the speed sensor of FIG. 12.

FIG. 14 illustrates a fifth embodiment of the present invention. This embodiment is a modification of the stop-acknowledgment means 113 shown in the fourth embodiment of the present invention.

The stop-acknowledgment means 113 in the present embodiment is the device in which is mounted an on-off switch 160 in speedometer 133 as a speed sensor. The stop-acknowledgment means 113 will be switched ON when the guide needle 141 is at the "0" position; when positioned at any other position, it will be OFF. The on-off switch 160 is also provided to stop the guide needle 141 at "0".

The contact 160a of the on-off switch 160 is mounted on the stay 138 through insulating material 161. The end of the contact protrudes on the side of the rotation shaft 139, and the other end is electrically connected with the control system through a wire lead 162. The other contact 160b is mounted along the radial direction of the rotation shaft 139 so that, together with the rotation of the rotation shaft 139, it will move in the same plane which perpendicularly intersects the rotation shaft 139. The contact 160b is electrically connected with the control system through the rotation shaft 139, the bearing 163 supporting the rotation shaft 139 for free rotation, the coupler 164 connected with the rotation magnet 136 and the speedometer cable 134, the bearing 165 supporting the coupler 164 in a freely rotating way; and the wire lead 166 being mounted on the bearing 165.

Figure 15:
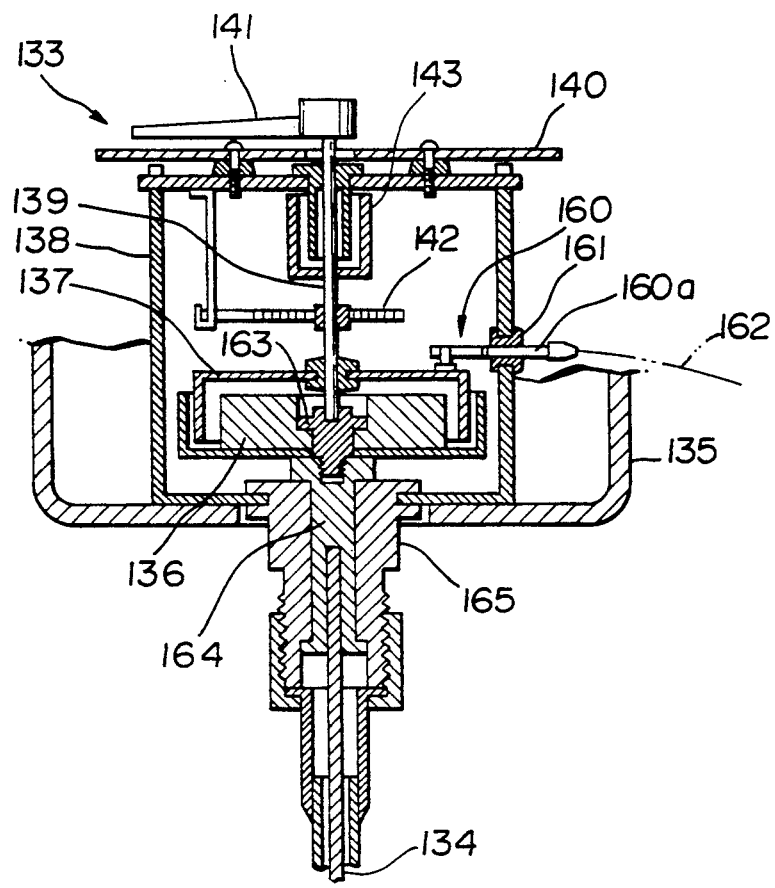
FIG. 15 is a cross section of another variation of the speedometer and the speed sensor in FIG. 12.
Figure 16:
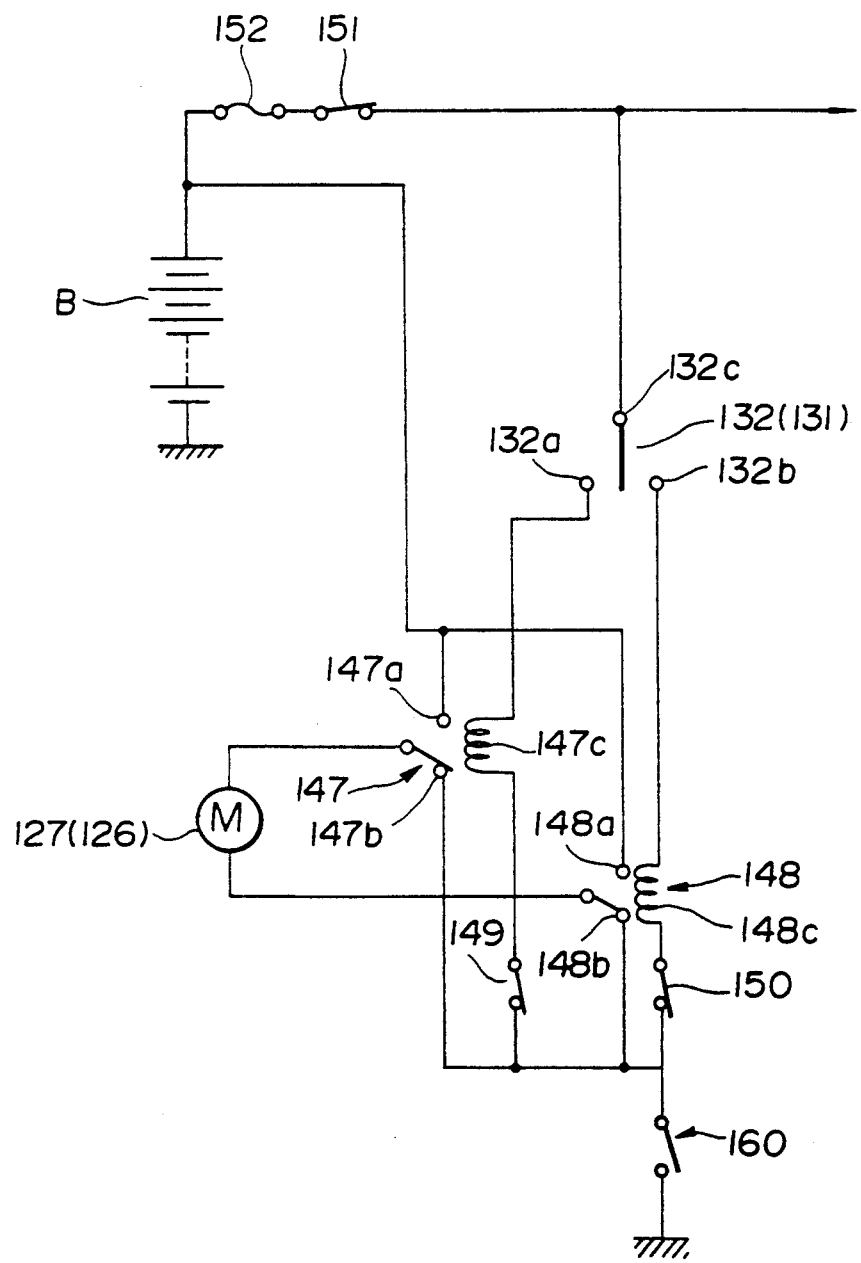
FIG. 16 is a control circuit diagram for the variation of the speedometer and the speed sensor of FIG. 15.

When both contacts 160a and 160b meet at the "0" position indicated by guide needle 141, it stops the rotation of the rotation shaft 139 and turns on the on-off switch 160 simultaneously. The other end of contact 160b may not only be mounted on the rotation shaft 139, but may also be mounted so as to protrude upwardly into engagement with the contact 160a, as shown in FIG. 15. The aluminum disk 137 will then freely rotate together with the rotation shaft 139; or the other contact 160b may be grounded through the speedometer cable 134 as a conductor to the vehicle. In such a case, the on-off switch 160 is required, as shown in FIG. 16, to be installed among the negative terminals of the battery B, both relays 147 and 148, and both limit switches 149 and 150.

Figure 17:
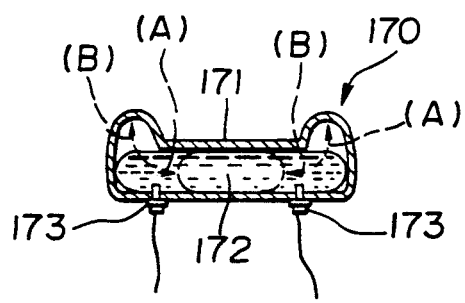
FIG. 17 is a longitudinal section through the motion sensor switch.

FIG. 17 illustrates a sixth embodiment of the present invention. In this embodiment, acceleration sensor 170 is used as the detector to determine if the vehicle is stationary.

The acceleration sensor 170 is composed of a hollow casing 171 mounted at a suitable position on the vehicle, electrically conductive liquid 172 (e.g., mercury) filled in the casing 171, a pair of electrodes 173 protruding out into the casing space 171 a suitable distance from the ends and from the bottom of the casing 171. It may be replaced with the proximity switch 146 in the fourth embodiment.

When a two-wheeled vehicle is undergoing changes in acceleration, the fluid in the sensor 170 moves in the direction (a) in FIG. 17 and the connection is broken. When the vehicle is decelerating, the fluid moves in the opposite direction and again the connection is broken. When the vehicle is stopped, the fluid is in contact with both electrodes 173, and the circuit is completed.

During operating of the vehicle, therefore, the operation of the stand motor 26 is blocked regardless of the operation of the switch 132 and the stand motor 26 can be operated to set the stand body 25 to the retracted position.

Figure 18:
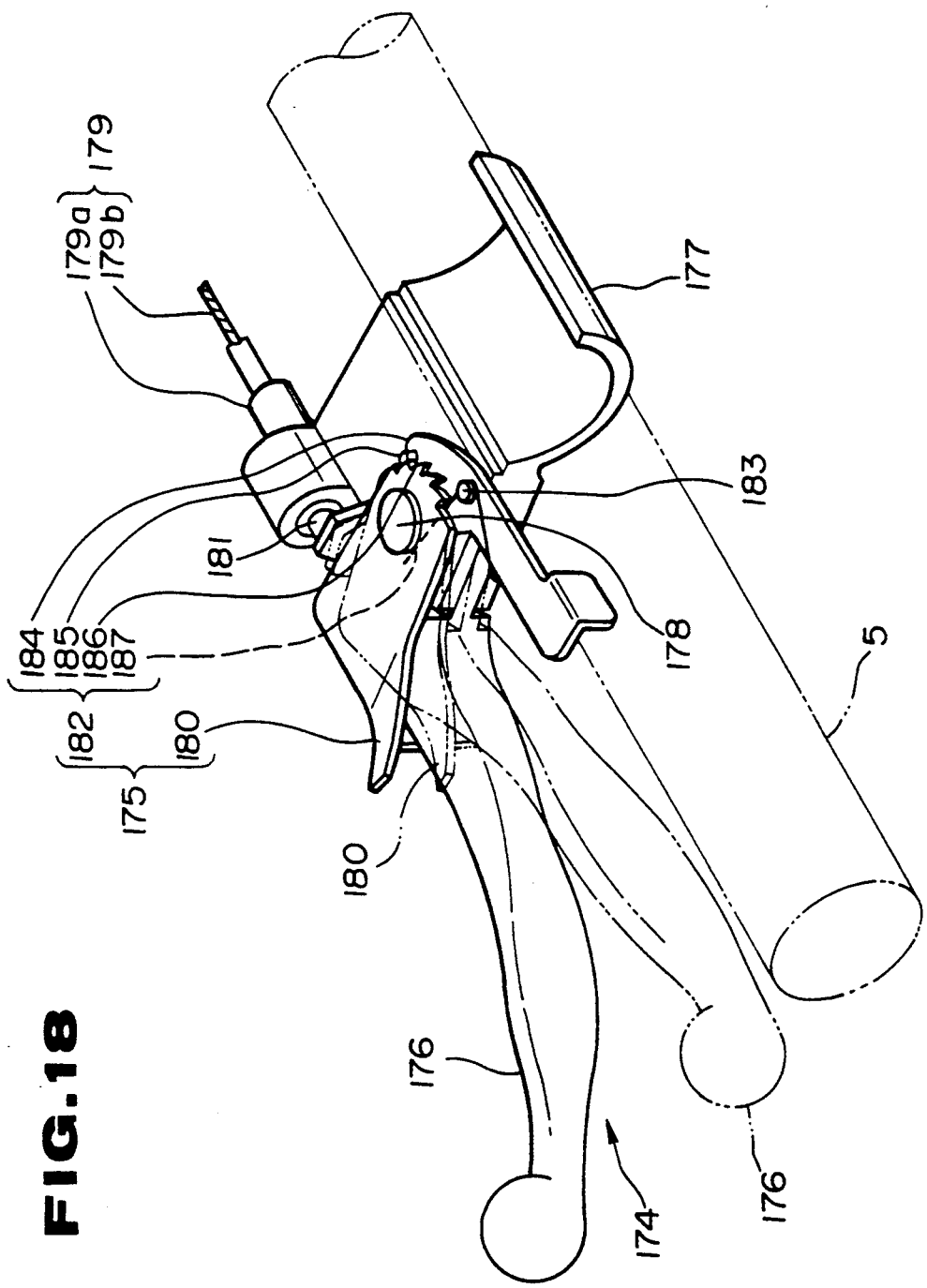
FIG. 18 is a view of a locking hand brake on a handle bar.

A seventh embodiment of the present invention is shown in FIG. 18. This embodiment utilizes a brake sensor 175 as the stop-acknowledgment means together with brake actuator 174 to determine if the vehicle is stopped. A brake lever 176 is mounted by a pivot shaft 178 for free rotation on a holder 177 fitted on the steering handle 5. The holder 177 is set with one end of the outer cable 179a of the brake cable 179 connected to the brake lever 176. The brake lever 176 is connected with the cable wire 179b.

The brake sensor 175 is mounted for free rotation on the pivot shaft 178 and includes a stop plate 180 rotatably mounted on brake lever 176, an on-off switch 181 fixed on the holder 177 and operated by the rotation of the stop plate 180, and a lock 182 which is located between the stop plate 180 and the holder 177 and stops the stop plate 180 at an arbitrary angular position. The lock 182 comprises a stop lever 184 mounted for free rotation on a second pivot shaft 183 protruding from holder 177 at a distance from the pivot shaft 178, a lock pin 185 protruding from the stop lever 184, a ratchet blade 186 formed in the stop plate 180 to engage the lock pin 185, and a spring 187 providing constant force in a direction to connect the stop lever 184 with the lock pin 185 and the ratchet blade 186. The stop plate 180 rotates and meets with the brake lever 176 after the brake lever 176 rotates. Since the stop plate 180 is held at the rotation position by the action of the lock 182, the brake lever 176 operated with the stop plate 180 is also held at the same operation position. The on-off switch 181 is set so that it is switched ON to stop the brake lever 176 at the control position at which the brake lever 176 remains when the stop plate 180 is rotated. Therefore the on-off switch 181 is installed at the same position as the proximity switch 146 of the control circuit as shown in the fourth embodiment of the invention.

In the operation of this embodiment, after first rotating the brake lever 176 to the control position, the stop plate 180 rotates to make contact with brake lever 176, and the stop plate 180 is stopped by the action of the lock 182. The brake lever 176 is stopped by the stop plate 180 at the same control position. Thus when the brake lever 176 is stopped at the control position, the vehicle is regarded as being stationary. The on-off switch 181 will be turned on by rotation of the stop plate 180. When this occurs, the on-off switch 181 is kept "ON", therefore, the drive control of the stand motor 26 is provided by the switch 132.

Conversely, to return the brake lever 176, the interlocking of the lock pin 185 and the ratchet blade 186 will be released by rotating the stop lever 184 against the force of the spring 187. The stop plate 180 and the brake lever 176 will be released and set back to the original positions by the tensile strength of the brake cable 179.

When the brake lever 176 and the stop plate 180 are set back, the on-off switch 181 will be turned off to make it impossible to extend the stand 25.

It should be noted that the shapes, dimensions, etc., in the components of the above discussion are merely examples, and it is quite possible to select other configurations of comparable efficacy.

What is claimed is:

1. An automatic stand device for a two-wheeled vehicle, comprising;
   a stand pivotally mounted to the vehicle;
   a motor to selectively extend and retract said stand;
   a transmission selectively coupled with said motor and said stand;
   a control circuit selectable to engage said transmission and to power said motor to extend said stand;

a sensor switch actuable to drive said control circuit when the vehicle is stationary, said sensor switch including an engine-speed monitor for detecting revolutions per minute; and a stand switch actuable by an operator to actuate said control circuit when said control circuit is rendered operable by said sensor switch.

2. The automatic stand device according to claim 1 wherein said motor includes an elastic member mounting said motor to the vehicle for preventing the transmission of shock produced when the stand touches the ground to the vehicle.

3. The automatic stand device according to claim 1 wherein said transmission comprises a driving gear driven by said motor and a driven gear having a fan shape, said driven gear being driven by said driving gear when said stand pivots to a predetermined position.

4. The automatic stand device of claim 1 wherein the engine includes an ignition system, said engine-speed monitor including a sensor circuit associated with the ignition system for counting pulses generated therefrom.

5. The automatic stand device of claim 4 wherein said sensor circuit converts said pulses into an analog electric value.

6. The automatic stand device of claim 1 wherein the engine includes a generator, said engine speed monitor including a sensor circuit for measuring the output of the generator.

7. An automatic stand device for a two-wheeled vehicle having an engine, comprising:

a stand pivotally mounted to the vehicle;

motor means for selectively moving said stand to an extended and to a retracted position with respect to said vehicle;

transmission means for operably connecting said motor means to said stand;

a control circuit for operating said motor means to move said stand to said extended and to said retracted positions, said control circuit including actuating switch means for selectively actuating said motor means to move said stand to said extended and to said retracted positions and disabling switch means operable to disable said motor means when said vehicle is moving; and an engine-speed monitor on said vehicle for sensing the rotational speed of said engine and said disabling switch means being responsive to said engine-speed monitor to disable said motor means when said engine speed exceeds a predetermined value.

8. The automatic stand device according to claim 7 in which said transmission includes drive gear means driven by said motor means and a reduction gear train operably connecting said drive gear means to said stand, said reduction gear train including means for disengaging said reduction gear train from said drive gear means when said stand is positioned in either one of its extended or retracted positions.

9. The automatic stand device of claim 7 wherein the engine includes an ignition system, said engine-speed monitor including a sensor circuit associated with the engine system for counting pulses generated therefrom.

10. The automatic stand device of claim 9 wherein said sensor circuit converts said pulses into an analog electric value.

11. The automatic stand device of claim 7 wherein the engine includes a generator, said engine speed monitor including a sensor circuit for measuring the output of the generator.

12. An automatic stand device for a two-wheeled vehicle having an engine, comprising:

a stand pivotally mounted to the vehicle;

motor means for selectively moving said stand to an extended and to a retracted position with respect to said vehicle;

transmission means for operably connecting said motor means to said stand;

a control circuit for operating said motor means to move said stand to said extended and to said retracted positions, said control circuit including actuating switch means for selectively actuating said motor means to move said stand to said extended and to said retracted positions and disabling switch means operable to disable said motor means when said vehicle is moving and, said control circuit being operative to disable said transmission means when said disabling switch means indicates movement of said vehicle;

an engine-speed monitor on said vehicle for sensing the rotational speed of said engine and said disabling switch means being responsive to said engine-speed monitor to disable said motor means when said engine speed exceeds a predetermined value.

13. A two-wheeled vehicle comprising:

a body;

an engine mounted on said body;

a rotatably mounted drive wheel;

an automatic clutch coupled between said engine and said drive wheel;

a stand pivotally mounted to said body;

a motor mounted on said body to selectively extend and retract said stand;

a transmission selectively coupled with said motor and said stand;

a control circuit selectable to engage said transmission and to power said motor to extend said stand;

a sensor switch actuable to drive said control circuit when the vehicle is stationary, said sensor switch including an engine-speed monitor for detecting revolutions per minute; and a stand switch actuable by an operator to actuate said control circuit when said control circuit is rendered operable by said sensor switch.

14. The two-wheeled vehicle of claim 13 wherein said automatic clutch is a centrifugal clutch.

15. The two-wheeled vehicle of claim 14 wherein said motor includes an elastic member mounting said motor to the vehicle for preventing the transmission of chock to said body produced when said stand touches the ground.

16. The two-wheeled vehicle of claim 14 wherein said transmission comprises a driving gear driven by said motor and a driven gear having a fan shape, said driven gear being driven by said driving gear when said stand pivots to a predetermined position.

17. The two-wheeled vehicle of claim 13 wherein said engine includes an ignition system, said engine-speed monitor including a sensor circuit for counting pulses generated by said ignition system.

18. The two-wheeled vehicle of claim 17 wherein said sensor circuit converts said pulses into an analog electric value.

19. The two-wheeled vehicle of claim 13 wherein said engine includes a generator, said engine-speed monitor including a sensor circuit to measure the output power of said generator.

20. The two-wheeled vehicle of claim 13 wherein said engine includes an ignition system, said engine-speed monitor including a sensor circuit for counting pulses generated by said ignition system and converting said pulses into an analog electric value, said automatic clutch being a centrifugal clutch.

21. The two-wheeled vehicle of claim 13 wherein said engine includes a generator, said engine-speed monitor measuring the output power of said generator, said automatic clutch being a centrifugal clutch.

22. A two-wheeled vehicle comprising:
a body;
an engine mounted to said body;
a rotatably mounted drive wheel;
a stand pivotally mounted to said body;
motor means for selectively moving said stand to an extended and to a retracted position with respect to said body;
transmission means for operably connecting said motor means to said stand;
a control circuit for operating said motor means, said control circuit including actuating switch means for selectively actuating said motor means to move said stand to said extended and to said retracted positions and disabling switch means operable to disable said motor means when said vehicle is moving; and
an engine-speed monitor on said body for sensing the rotational speed of said engine and said disabling switch means being responsive to said engine speed monitor to disable said motor means when said engine speed exceeds a predetermined value.

23. The two-wheeled vehicle of claim 22 wherein said control circuit is operative to disable said transmission means when said disabling switch means indicates movement of the vehicle.

24. The two-wheeled vehicle of claim 22 further comprising an automatic clutch coupled between said engine and said drive wheel.

25. The two-wheeled vehicle of claim 24 wherein said automatic clutch is a centrifugal clutch.

26. The two-wheeled vehicle of claim 23 further comprising an automatic clutch coupled between said engine and said drive wheel.

27. The two-wheeled vehicle of claim 26 wherein said automatic clutch is a centrifugal clutch.

28. A two-wheeled vehicle comprising:
a body;
an engine mounted on said body;
a rotatably mounted drive wheel;
an automatic clutch coupled between said engine and said drive wheel; said automatic clutch being a centrifugal clutch;
a stand pivotally mounted to said body;
a motor mounted on said body to selectively extend and retract said stand;
a transmission selectively coupled with said motor and said stand, said transmission including drive gear means driven by said motor mans and a reduction gear train operably connecting said drive gear means to said stand, said reduction gear train including means for disengaging said reduction gear train from said drive gear means when said stand is positioned in either one of its extended or retracted positions;
a control circuit selectable to engage said transmission and to power said motor to extend said stand, said control circuit including actuating switch means for selectively actuating said motor means to move said stand to either one of its extended or retracted positions and a disabling switch;
an engine speed monitor for sensing the rotational speed of said engine and said disabling switch being responsive to said engine speed monitor to disable said motor means when said engine speed exceeds a predetermined value.

* * * * *

UNITED STATES PATENT AND TRADEMARK OFFICE
CERTIFICATE OF CORRECTION

PATENT NO. : 5,100,164
DATED : March 31, 1992
INVENTOR(S) : Miyamaru et al.

It is certified that error appears in the above-identified patent and that said Letters Patent is hereby corrected as shown below:

In claim 15 (col. 12, line 54), delete "chock" and insert therefor -- shock --.

In claim 28 (col. 14, line 19), after "motor" insert -- means --.

In claim 28 (col. 14, line 23), delete "mans" and insert therefor -- means --.

Signed and Sealed this

Twenty-third Day of August, 1994

*Attest:*

BRUCE LEHMAN

*Attesting Officer*     *Commissioner of Patents and Trademarks*